Oct. 25, 1949.　　　　O. H. SCHMITT　　　　2,485,847
COMBINATION MAGNETOMETER AND GRADIOMETER
Filed Sept. 23, 1944
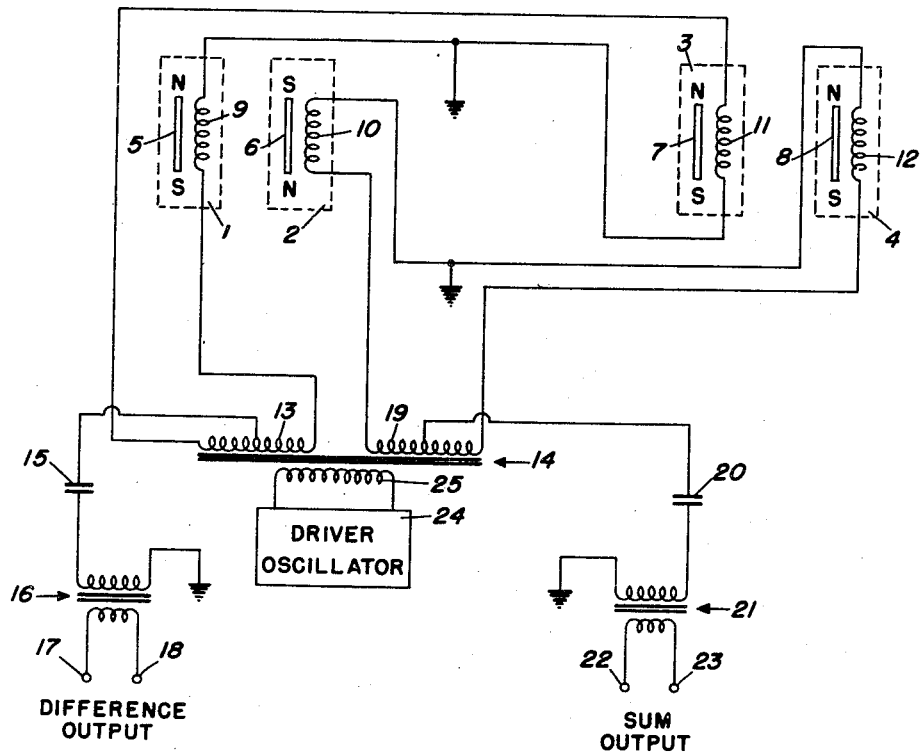
Inventor
OTTO H. SCHMITT
By
Attorney Patented Oct. 25, 1949

2,485,847

UNITED STATES PATENT OFFICE 2,485,847

COMBINATION MAGNETOMETER AND GRADIOMETER

Otto H. Schmitt, Port Washington, N. Y., assignor to the United States of America as represented by the Secretary of the Navy Application September 23, 1944, Serial No. 555,538

2 Claims. (Cl. 177—352)

This invention relates to a combination magnetometer and gradiometer, and more particularly to a system for providing simultaneously indications of the sum and of the difference of the magnetic field strength existing at two different points.

For certain special purposes, it is frequently desired to provide a pair of output signals, one of which is proportional to the sum and the other proportional to the difference of the magnetic field intensities measured at two different points. These points, for example, may be the respective wing tips of an airplane.

In previous arrangements for accomplishing this, separate magnetometers and detectors were provided for each measuring point, and the outputs of these two detectors were combined to produce sum and difference signals. Such an arrangement is disclosed in copending application Serial No. 531,422, filed April 17, 1944 by Victor V. Vacquier and John N. Adkins, entitled "Directional indicator system." Such an arrangement has the inherent disadvantage that the two magnetometer-detector-amplifier combinations must originally have, and must maintain, very closely equal sensitivities if the results are to be useful.

In accordance with the present invention, it is proposed to overcome this disadvantage by employing four half magnetometer systems, two of which are mounted relatively close together at each of the measuring points, and to connect these magnetometer elements in such a manner that one pair, comprising one element at each measuring point, functions as a magnetometer to produce a sum signal, and the remaining pair functions as a gradiometer to produce a difference signal. The separate pairs of magnetometer elements are preferably, but not necessarily, of the saturated-core type which are connected to operate in the manner disclosed in my copending application Serial No. 516,612, filed January 1, 1944. The latter application discloses a so-called unbalanced magnetometer, but it is understood that the system of the present invention may employ balanced magnetometers such as those disclosed in Henry B. Riblet's application Serial No. 534,961, filed May 10, 1944, if desired.

The present invention contemplates a combination magnetometer and gradiometer comprising a plurality of magnetic elements, each including at least one winding and being grouped in two pairs disposed with their magnetic axes substantially parallel. The connections between the windings of one element of each group are such that an output signal corresponding to the sum of the magnetic field intensities at their respective locations is provided, and the connections between the windings of the other element of each group are such that an output signal corresponding to the difference of the magnetic field intensities at their respective locations is provided. Means are provided for utilizing these sum and difference output signals. While any suitable means may be used for the latter purpose, the dual amplification system disclosed in my copending application Serial No. 548,491, filed August 7, 1944 is especially advantageous for this purpose.

For a better understanding of the invention, reference is made to the accompanying drawing, the single figure of which is a diagram, partly in block form, of a combination magnetometer and gradiometer in accordance with the present invention.

Referring now to the drawing, there are shown four magnetometer elements 1, 2, 3 and 4, comprising respectively high-permeability magnetic cores 5, 6, 7 and 8, and windings 9, 10, 11 and 12. Windings 9 and 11 of magnetometer elements 1 and 3 are connected in series, in such a sense that similar poles of cores 5 and 7 are similarly directed, between the terminals of winding 13 of transformer 14. The center tap of winding 13 is connected through capacitor 15 to the primary winding of output transformer 16, the secondary winding of which is connected to difference output terminals 17 and 18. The junction of windings 9 and 11 is grounded, as is the other terminal of primary winding of transformer 16. Windings 10 and 12 of magnetometer elements 2 and 4 likewise are connected in series, but in such a sense that similar poles of magnetic cores 6 and 8 are oppositely directed, between the terminals of winding 19 of transformer 14. The junction of windings 10 and 12 is grounded. The center tap of winding 19 is connected through capacitor 20 to one terminal of the primary winding of output transformer 21, the other terminal of this winding being grounded. The secondary winding of transformer 21 is connected to sum output terminals 22 and 23. Driver oscillator 24 is connected to winding 25 of transformer 14.

In operation, driver oscillator 24 alternately causes the saturation of magnetic cores 5, 6, 7 and 8 first in one sense and then in the other. This in turn results in a pulse output from each magnetometer element which is a function of the ambient magnetic field surrounding that element. Due to the connections of windings 9 and 11, an output signal proportional to the difference of the outputs of magnetometer elements 1 and 3 appears at terminals 17 and 18. The output signal which appears at terminals 22 and 23, however, is proportional to the sum of the outputs of magnetometer elements 2 and 4.

If it is desired to use the combination magnetometer and gradiometer of the invention to observe changes in the ambient magnetic field rather than its absolute value, suitable means may be provided for introducing a direct-current component in the magnetometer elements of proper magnitude and polarity to counteract the effect of the earth's magnetic field. If such neutralizing means are provided, capacitors 15 and 20 prevent the primary windings of transformers 16 and 21 from short-circuiting the source of direct-current potential employed for this purpose.

In one practical embodiment of the arrangement in accordance with the invention, it was found that a spacing of not less than two inches between the elements mounted at each measuring point provided a satisfactory amount of freedom from interaction. The spacing between the measuring points is preferably as large as possible and, in the usual practical application of the invention, will be of the order of fifty or more feet.

While many applications of the invention will suggest themselves to those skilled in the art, the present invention lends itself especially well for use in directional indicator systems such as that disclosed in the above-mentioned copending application of Victor V. Vacquier et al. Serial No. 531,422 filed April 17, 1944, for Directional indicator system; and in bombing controls and missile releases such as those disclosed respectively in James H. Stein's copending applications Serial Nos. 543,505, filed July 4, 1944, for Bombing control and 548,578, filed August 8, 1944 for Selective automatic missile release.

What is claimed is:

1. In a magnetometer system in which signals proportional to the sum and difference of the magnetic fields at two spaced points is required, means for obtaining such signals comprising a pair of magnetometer elements located at each of the spaced points, each element including a magnetic core and a coil extending normally to the line joining said points, a drive transformer having a pair of equal secondary windings, one of said windings being connected in a series circuit with one of the magnetometer coils in each pair in the same polarity, the other winding in a series circuit with the other magnetometer coils, one of said coils being connected in reverse polarity, the junctions between said coils being grounded, a driver oscillator for energizing the primary in said transformer, and a pair of transformers having input windings fed from the midpoints of said transformer secondaries, and output windings for delivering signals proportional to the sum and difference of said magnetic fields respectively.

2. In a magnetometer system in which signals proportional to the sum and difference of the magnetic fields at two spaced points is required, means for obtaining such signals comprising means located at spaced points for producing signals proportional to the components of a magnetic field in a direction normal to the line joining said points, a drive transformer having a pair of equal secondary windings, a pair of circuits for impressing said signals in series in the same polarity on one of said windings and in series in opposite polarity on the other respectively, said circuits being grounded between said signal means, a pair of output transformers having their primary windings connected to the midpoints of said drive transformer windings, and secondary windings for delivering output signals proportional to the sum and difference of said magnetic fields respectively.

OTTO H. SCHMITT.

REFERENCES CITED

The following references are of record in the file of this patent:

UNITED STATES PATENTS

| Number | Name | Date |
|---|---|---|
| 1,787,992 | McIlvaine | Jan. 6, 1931 |
| 1,839,290 | Bailey | Jan. 5, 1932 |
| 1,968,068 | Blancard et al. | July 31, 1934 |
| 2,036,814 | La Pierre et al. | Apr. 7, 1936 |
| 2,238,072 | Nelson et al. | Apr. 15, 1941 |

FOREIGN PATENTS

| Number | Country | Date |
|---|---|---|
| 399,957 | Great Britain | Oct. 19, 1933 |